United States Patent
Hall et al.

(10) Patent No.: US 8,270,086 B1
(45) Date of Patent: Sep. 18, 2012

(54) UNI-DIRECTIONAL BEAM SPLITTER COATING

(75) Inventors: John M. Hall, Amherst, NH (US); Scott Payette, Lowell, MA (US)

(73) Assignee: BAE Systems OASYS LLC, Manchester, NH (US)

( * ) Notice: Subject to any disclaimer, the term of this patent is extended or adjusted under 35 U.S.C. 154(b) by 1431 days.

(21) Appl. No.: 11/828,833

(22) Filed: Jul. 26, 2007

Related U.S. Application Data

(60) Provisional application No. 60/868,417, filed on Dec. 4, 2006.

(51) Int. Cl.
*G02B 27/14* (2006.01)
(52) U.S. Cl. .................................. 359/629; 359/618
(58) Field of Classification Search .......... 359/618
See application file for complete search history.

(56) References Cited

U.S. PATENT DOCUMENTS

| | | | |
|---|---|---|---|
| 5,617,247 A * | 4/1997 | Rowland | 359/515 |
| 5,696,521 A | 12/1997 | Robinson et al. | |
| 6,384,982 B1 | 5/2002 | Spitzer | |
| 6,724,354 B1 | 4/2004 | Spitzer et al. | |
| 6,809,871 B2 | 10/2004 | Heller et al. | |
| 7,133,207 B2 | 11/2006 | Travers | |

OTHER PUBLICATIONS

Manhart, Paul K, et al., "'Augeye': A Compact, Solid Schmidt Relay for Helmet Mounted Displays," Proceedings 1993 IEEE Virtual Reality Annual International Symposium, Seattle, WA, pp. 234-245.
Edmund Optics, Barrington, NJ; Optics & Optical Instruments Catalog 2006; Product ID T47-020, et al., "Polka-Dot Beamsplitters."

* cited by examiner

*Primary Examiner* — James Jones
(74) *Attorney, Agent, or Firm* — Houston & Associates, LLP

(57) ABSTRACT

A beam splitter optical surface comprises a transparent substrate and a multilayer optical coating applied in a pattern onto the transparent substrate. The multilayer optical coating has at least an optically reflective layer and an optically absorbent layer.

30 Claims, 3 Drawing Sheets

UNI-DIRECTIONAL BEAM SPLITTER COATING

RELATED APPLICATIONS

This application claims the benefit under 35 USC 119(e) of U.S. Provisional Application No. 60/868,417, filed on Dec. 4, 2006, which is incorporated herein by reference in its entirety.

BACKGROUND OF THE INVENTION

There are a variety of applications for optical systems that combine light from two different sources, such as from multiple displays or a display and the environment. One common application is a camera viewfinder that superimposes data from a digital display onto the image received through the camera's lens. Other applications are head, e.g., helmet, mounted display systems. These systems typically include image displays such as micro-flat-panel display devices based on organic light emitting diode (OLED) technology or active-matrix liquid crystal display (AMLCD) technology, for example. The systems also include eyepieces that couple the light from the display devices and light from the environment to the users' eyes. The head/helmet-mounted display systems are used in the military, in field operations and simulations, medical procedures, and industrial maintenance operations. There are now also opportunities to use head-mounted displays for game consoles, cellular phones, portable video players, and other entertainment and communication devices.

"Solid-Schmidt" prism eyepieces are a particularly attractive optical design approach for these optical systems that combine images from two different sources. The "Solid-Schmidt" design is well known in the prior art, using a powered mirror surface in conjunction with a double-pass beam splitter surface. See, e.g., U.S. Pat. No. 5,696,521 to Robinson, et. al. This optical system provides excellent image quality by means of having all the primary optical power provided by a single optically powered mirror surface. However, because of the reflective nature of the mirror element, it is necessary to utilize some form of beam-splitting components such that the light may pass in the desired direction.

SUMMARY OF THE INVENTION

The beam-splitting component, however, produces undesirable consequences. Part of the light from the display, for example, is emitted out the front side, which is often unwanted. A conventional technique for suppressing the unwanted emission involves the application of an absorptive coating on the front face of the prism, such that the specific wavelengths emitted by the display source are absorbed. Alternatively, if the source is polarized, a polarization filter can applied for a similar effect. Both of these options will interfere, however, with the normal "see-through" function of the prism eyepiece, by reason that the same filtering techniques applied to suppress the unwanted emissions from the display source will also suppress radiation coming in from the surroundings.

A technique is needed by which the reflection of the display device, which would otherwise exit out the front face, is suppressed, but without degrading the ability of the system to provide a natural "see-through" capability. To do so, the suppression should not include selective wavelength or polarization filtering. It must also be fairly insensitive to incident angles, and must be robust, such that it can be cemented between two halves of a cube shaped prism.

There are a variety of spatially-variant beam splitter devices, such as "Polka-Dot" beam splitters. These simple components consist of optical substrates coated with tiny dots made of reflective metal materials such as aluminum or silver. The spacing between "dots" is on the order of 0.15 millimeters (mm). When a beam of light hits the splitter, roughly half is reflected and the other half is transmitted. The problem with this commercial device is that the splitter properties are roughly the same for light incident from either side.

The present invention, on the other hand, involves applying a spatially variant, one-way mirror coating to the beam splitter surface of an optical element.

An embodiment of the present invention includes a beam splitter device having a special optical coating such that in one direction, only one of the two potential optical paths will pass light rays. Light rays hitting the opposite side of the splitter, however, will be separated into two paths as is common with optical beam splitters. An application for this invention is usage in a head-mounted display eyepiece where suppression of stray radiation is critical, but the invention is not restricted to this usage and has application to a variety of other optical devices such as camera viewfinders, telecom switching, etc.

In general according to one aspect, the invention features a beam splitter optical surface having a transparent substrate and a multilayer optical coating applied in a pattern onto the transparent substrate. The multilayer optical coating has least an optically reflective layer and an optically absorbent layer.

Generally any pattern may be utilized. In one embodiment, the pattern is a polka dot pattern. In another embodiment, the pattern comprises concentric circles, for example where each circle has a radius that differs from an adjacent circle (i.e., the circle just inside or outside) by approximately 0.15 mm.

Light incident on a first side of the multi-layer coating is partially reflected and partially transmitted through the beam splitter surface, while light incident on a second side of the multi-layer coating is partially absorbed and partially transmitted through the beam splitter surface.

In general according to another aspect, the invention features an optical element for an eyepiece. The element comprises a body, in which a first surface of the body receives light from a display device. The light passes through a second surface of the body to an eye of a user, and a beam splitter surface is located optically between the first surface and the second surface. The beam splitter surfaces folds an optical path between the first surface and the second surface, and comprises an optical coating applied in a pattern. The multilayer optical coating comprises an optically reflective layer and an optically absorptive layer.

Preferably, the beam splitter surface is within the body. Moreover, the optical element may have a second reflecting surface that receives the light from the display device via the first surface and through the beam splitter surface, and that directs the light back into the beam splitter surface. The second reflecting surface may be curved to provide optical power. In some embodiments, the body comprises two pieces with the beam splitter surface being within the body. For example, the beam splitter surface may be located at the interface between the two pieces of the body, being formed or deposited on one of the pieces.

In some embodiments, the display device is a flat panel display.

The optical element may further comprise a third surface of the body through which light from an environment is received. Preferably, the light from the environment passes through the second surface to the eye of the user. Preferably the light from the environment passes through the beam splitter surface on the path to the second surface and to the eye of the user. In some embodiments, the second surface and the third surface are planar surfaces. Light from the environment may be provided by an image intensifier device.

In general, according to yet another aspect, the invention features a head-mounted display system comprising a display for generating an image, and an eyepiece for coupling the image from the display device to an eye of a user. The eyepiece has a single body for coupling the image of the display device to the eye. The eyepiece body has a first surface for receiving light from the display device, a second surface through which the light from the display device passes to the eye of the user, and a beam splitter surface, located optically between the first surface and the second surface, for folding an optical path between the first surface and the second surface. The beam splitter surface comprises an optical coating applied in a pattern. The multilayer optical coating comprises an optically reflective layer and an optically absorptive layer.

In general according to still another aspect, the invention features a fabrication process for a beam splitter surface. The process comprises applying a first, optically reflective coating layer to an optically transparent substrate, applying a second, optically absorbent coating layer on top of the first layer, and etching, preferably using single point diamond turning, a pattern into the first and second layers, such that a first portion of the substrate is uncoated while a second portion of the substrate is coated. Thus, light incident on a first side of the beam splitter surface is partially reflected and partially transmitted through the beam splitter surface, while light incident on a second side of the beam splitter surface is partially absorbed and partially transmitted through the beam splitter surface.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
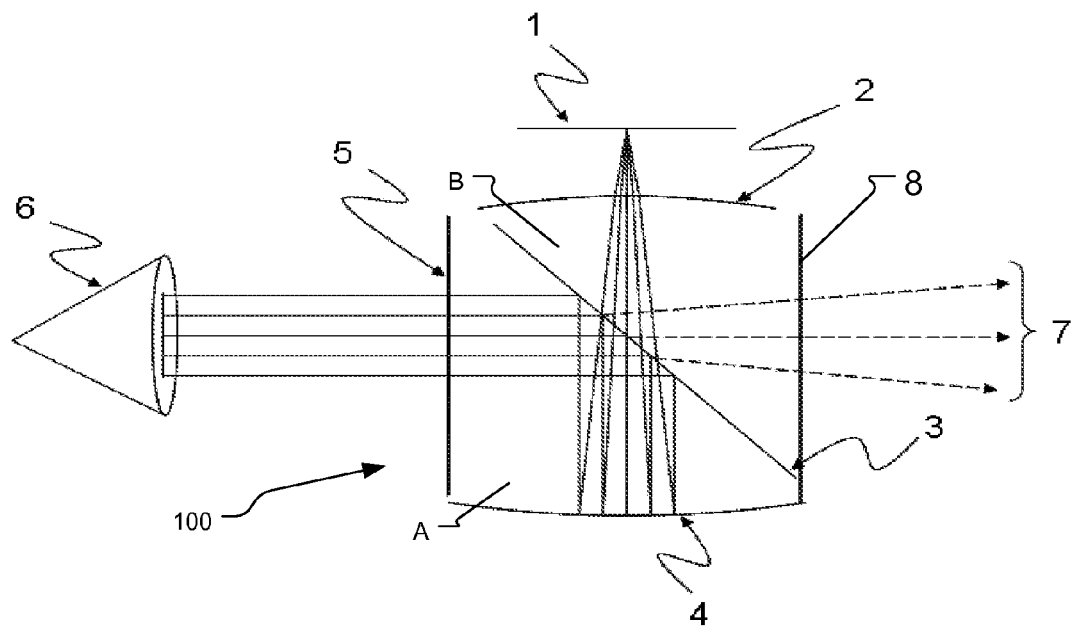
FIG. 1 is a top plan view of an optical element for an eyepiece of a head-mounted display system according to the present invention.

FIG. 1 illustrates a "Solid-Schmidt" prism eyepiece optical system 100, which has been constructed according to the principles of the present invention.

Light from pixels on a display source 1 enters the prism eyepiece 100 through an entrance port 2, which may also feature some measure of optical power. An intervening field lens may also, or in the alternative, be present.

Light then strikes a beam splitter surface 3, such that approximately 50%, in one example, of the light continues down into the prism. The other portion of the light is suppressed, e.g., absorbed, according to the present invention, instead of exiting (7) through the front face 8, as in conventional designs. Light then reflects off of a mirrored surface 4, which provides the primary optical dioptric power, in one embodiment, and collimates the light rays as is customary for an eyepiece. The light then strikes the backside of the splitter surface 3, after which about 50% of the light is reflected off the splitter surface 3, and exits the prism 5, entering the human eye 6. The other portion of the light passes straight through the beam splitter 3, exits through the entrance port 2, and is harmlessly defocused onto the image source 1.

In one example, the eyepiece is fabricated in two pieces A, B with the beam splitter occurring at the junction or interface between the two pieces. Thus, the beam splitter surface 3 is usually formed on one of the two pieces, A or B. The intervening space between the pieces is then filled with an index-matching, optically-transmissive cement.

Figure 2:
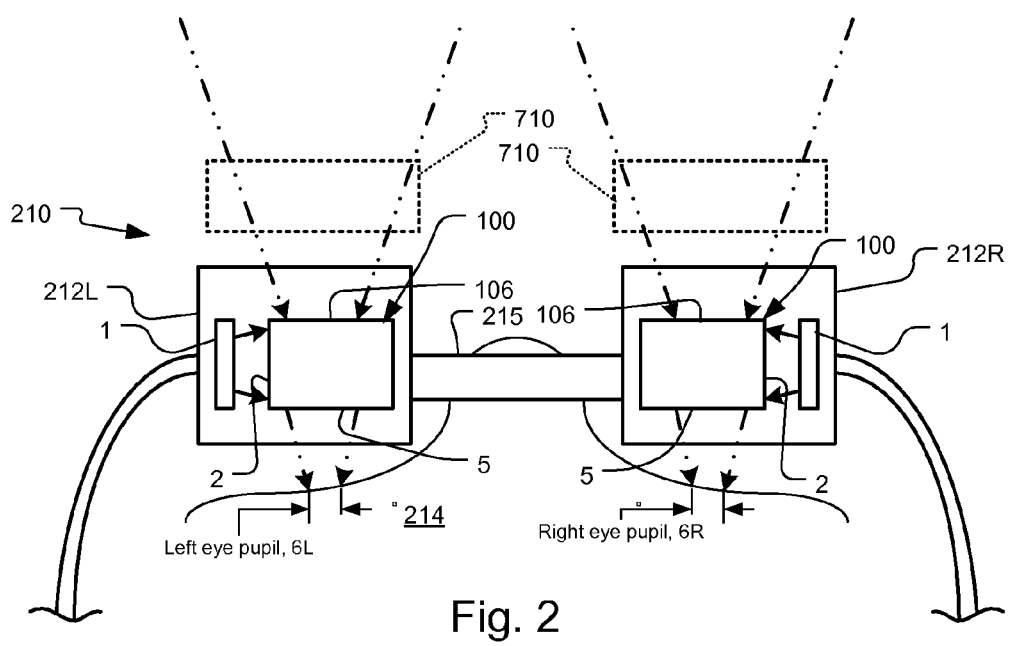
FIG. 2 is a top schematic view showing a head-mounted display system according to the invention being worn by a user.

FIG. 2 shows how the inventive eyepiece optical system 100 is used in an exemplary head (helmet)-mounted display system 210.

In one example, the head-mounted display system 210 has right and left eye or ocular systems 212R, 212L. These are supported on the user 214 by a frame 215, in front of the right and left eye pupils 6R, 6L of the user 214 to yield a binocular system.

Each eyepiece system 212R, 212L comprises, in one example, separate display devices 1. Light from the display devices 1 is coupled into the respective eyepieces 100 via display entrance ports 2 and then to the user's pupils 6R, 6L via exit ports 5.

The eyepieces 100 also couple light from an environment to the user's pupils 6R, 6L via environment entrance ports 8 and the respective exit ports 5. A typical "see-through" application requires that there be no optical power in the environmental light path in order to afford normal vision. However, this environmental light may also be preprocessed using image intensifier devices 710 in some implementations. In these cases, the environmental optical path provides optical power equivalent or better than that of a typical intensifier eyepiece.

Figure 3:
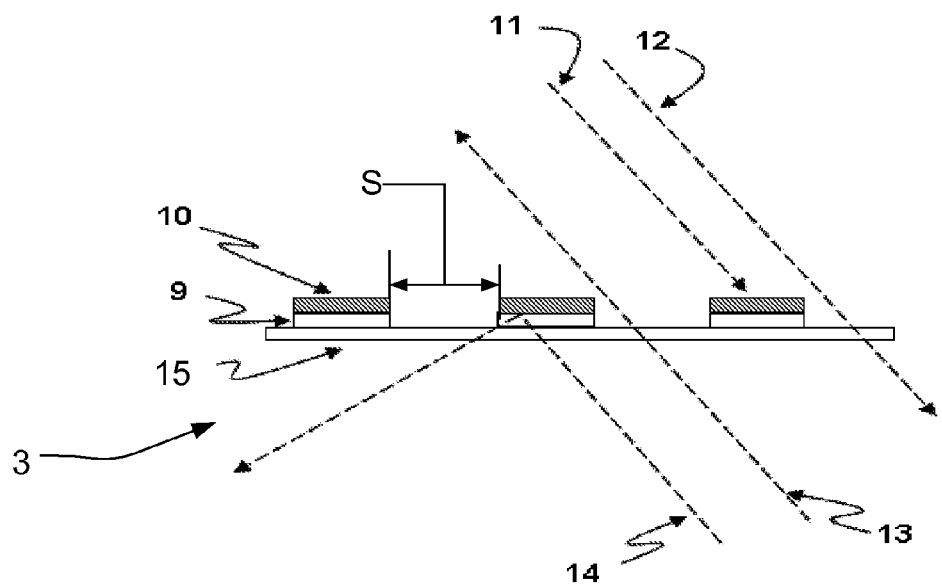
FIG. 3 is a top schematic view of an optical element for an eyepiece of the inventive head-mounted display system, according to a first embodiment.

FIG. 3 provides a top schematic view of beam splitter 3 according to an embodiment of the present invention.

A spatially variant coating is applied to substrate surface 15. The substrate surface 15 is a thin membrane that is bonded in the junction between pieces A and B of the eyepiece 100 in one example. In a preferred embodiment, the substrate 15 is the mating surface of one of the pieces A, B of the eyepiece 100.

In one example, the coating comprises two layers: the first coating layer 9 provides a high degree of reflection such as greater than 80% and preferably over 90%. Reflective coatings for the optical wavelengths include metals such as silver or aluminum. An alternative coating is a dielectric stack with broad spectral properties. Such stacks have alternating layers of high and low index materials. The second coating layer 10 is a material, which is optically black for the desired spectrum. This layer 10 comprises absorbent material(s) that are both non-transmissive and non-reflective for the spectrum in question. The absorptive layer 10 is comprised of black resin, paint, or carbonic paste in some examples. The two layers 9, 10 of the coating are stacked on top of each other on the substrate 15.

The sequence of the layers 9, 10 is determined by which side requires reflection and which side requires absorption, that is to say, the reflective coating 9 in on top of the absorbing coating 10 in some examples, such as when the layers are applied to the mating surface of piece B.

The regions of these layered coatings 9, 10 are preferably spaced uniformly about the substrate in a pattern such that only half, or other desired percentage, of the area of the substrate 15 bears the coatings, with the other area left either bare or perhaps treated with other coatings used for durability or standard anti-reflection purposes. The spacing S between coated areas and the gaps should be such that the gap spacing is much less than the width of the entire optical beam, yet large enough compared to the wavelength of light such that unwanted diffraction effects do not occur. As with the case for commercially available "Polka Dot" splitters, spacing on the order of 0.15 mm is sufficient for many uses in the visible spectrum. Likewise, the total layer thickness should also be kept minimal, with thicknesses on the order of tens of microns as is customary in the art of optical coating.

The function of the one-way coating layers 9, 10 thus depends upon the direction of the incident light source. If the source is coming from the black or absorbent layer 10 side, then half of the source light will be absorbed by the black coating 11 and half will pass through (for example, ray 12). On the other hand, about half of the light that is incident to the reflective 9 side will pass through (ray 13) the beam splitter surface, while the other half of the incident light will undergo reflection (ray 14). This is exactly the set of properties required to suppress the first surface unwanted reflection 7 shown in FIG. 1.

There are several possible methods for fabricating such components, including standard methods of lithographic photo-masking and coating deposition that are common in the art.

Another innovative method of fabrication, which can significantly reduce production costs, is single-point diamond turning (SPDT) when the element substrates are made from materials known to have properties amenable to this technique. Examples of such materials include optical plastics such as acrylic or polystyrene, crystals such as zinc sulphide (ZnS) and zinc selenide (ZnSe), as well as amorphous materials such as AMTIR-1 or GASIR-2. For a head-mounted display eyepiece, the optical plastics appear to have the most relevance. For such substrates, it is possible to deposit the reflective 9 and absorptive 10 coatings as uniform, unbroken layers. This allows standard coating procedures, without the need for special masks or lithographic techniques.

Figure 4:
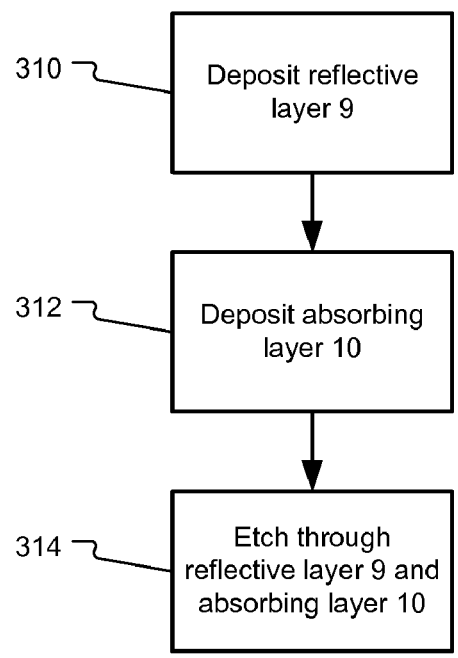
FIG. 4 is a flowchart showing a process for fabricating a beam splitter surface according to an embodiment of the present invention.

FIG. 4 is a flowchart showing a process for fabricating a beam splitter surface 3 according to an embodiment of the present invention. In step 310, the reflective layer 9 is applied to the substrate. In step 312, the absorbing layer 10 is applied. Note that the sequence of these steps 310, 312 is determined by: on which of the two pieces A, B of eyepiece 100, the beam splitter 3 is to be formed.

Figure 5:
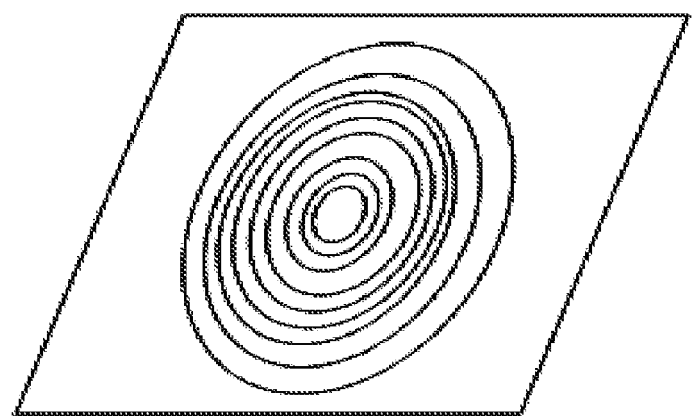
FIG. 5 is a schematic view illustrating a pattern employed by an embodiment of the present invention, optimized for fabrication via single-point diamond turning

Once coated, the layers are patterned (step 314), such as scribed via SPDT such that what remains is a surface with about half the area bearing the coating layers 9, 10, but the other half showing only bare substrate or substrate coated with other layer(s). Because SPDT is best with rotationally symmetric surface generation, a pattern of concentric circles with roughly 0.15 mm change in radii is preferred for ease of manufacture. FIG. 5 illustrates an exemplary pattern.

In alternative embodiments, a patterned chemical etch or a lift off or masking process is used to pattern the absorbing layer 10 and the reflective layer 9.

As can be appreciated, the unidirectional beam splitter of the present invention is ideal for use in a "see-through" head mounted display eyepiece configuration, particularly for the purpose of suppressing unwanted emissions without adversely impacting the view of the real world.

In a further embodiment, the ratio of the coated area to the non-coated area is controlled during manufacture of the beam splitter 3 such that the ratio defines the amount of light absorbed for light incident onto the first side, and an amount of light reflected for light incident onto the second side.

While this invention has been particularly shown and described with references to preferred embodiments thereof, it will be understood by those skilled in the art that various changes in form and details may be made therein without departing from the scope of the invention encompassed by the appended claims.

What is claimed is:

1. A beam splitter optical surface, comprising:
a transparent substrate; and
a multilayer optical coating applied in a pattern onto the transparent substrate, the multilayer optical coating comprising an optically reflective layer on a first side and an optically absorbent layer on a second side;
wherein light incident on the first side of the multi-layer coating is partially reflected and partially transmitted through the beam splitter surface, and light incident on the second side of the multi-layer coating is partially absorbed and partially transmitted through the beam splitter surface.

2. The beam splitter optical surface of claim 1, wherein the pattern is a polka dot pattern.

3. The beam splitter optical surface of claim 1, wherein the pattern comprises concentric circles.

4. The beam splitter optical surface of claim 3, wherein each circle of the concentric circles has a radius which differs from an adjacent circle by approximately 0.15 mm.

5. The beam splitter optical surface of claim 1, wherein the optically reflective layer comprises at least one of silver or aluminum.

6. The beam splitter optical surface of claim 1, wherein regions of the substrate that are not coated with the multilayer optical coating are coated with at least one of a durability treatment and an anti-reflection treatment.

7. An optical element for an eyepiece, comprising:
a body;
a first surface of the body for receiving light from a display device;
a second surface of the body through which the light from the display device passes to an eye of a user; and
a beam splitter surface, optically between the first surface and the second surface, for folding an optical path between the first surface and the second surface, the beam splitter surface comprising a multilayer optical coating applied in a pattern, the multilayer optical coating comprising an optically reflective layer and an optically absorbent layer.

8. The optical element of claim 7, wherein a ratio of coated area to non-coated area defines an amount of light absorbed for light incident onto the first side, and an amount of light reflected for light incident onto the second side.

9. An optical element as claimed in claim 7, wherein the beam splitter surface is within the body.

10. An optical element as claimed in claim 9, further comprising a second reflecting surface for receiving the light from the display device, received via the first surface and through the beam splitter surface, and directing the light back into the beam splitter surface.

11. An optical element as claimed in claim 10, wherein the second reflecting surface is curved to provide optical power.

12. An optical element as claimed in claim 9, wherein the body comprises two pieces with the beam splitter surface being within the body.

13. An optical element as claimed in claim 9, wherein the body comprises two pieces with the beam splitter surface being at an interface between the two pieces of the body.

14. An optical element as claimed in claim 7, further comprising a third surface of the body through which light from an environment is received.

15. An optical element as claimed in claim 14, wherein the light from the environment passes through the second surface to the eye of the user.

16. An optical element as claimed in claim 14, wherein the light from the environment passes through the beam splitter surface on the path to the second surface and to the eye of the user.

17. An optical element as claimed in claim 14, wherein the second surface and the third surface are planar surfaces.

18. An optical element as claimed in claim 14, wherein the light from the environment is provided by an image intensifier device.

19. An optical element as claimed in claim 7, wherein the display device is a flat panel display.

20. A head-mounted display system comprising:
a display device for generating an image; and
an eyepiece for coupling the image from the display device to an eye of a user, the eyepiece including:
a first surface for receiving light from the display device,
a second surface through which the light from the display device passes to the eye of the user, and
a beam splitter surface, optically between the first surface and the second surface, for folding an optical path between the first surface and the second surface, the beam splitter surface comprising an optical coating in a pattern, the optical coating comprising an optically reflective side and an optically absorbent side.

21. The head-mounted display system of claim 20, wherein at least one of the first surface, the second surface and the beam splitter surface is curved to provide optical power.

22. The head-mounted display system of claim 20, wherein the beam splitter surface is within the body.

23. The head-mounted display system of claim 22, further comprising a second reflecting surface for receiving the light from the display device from the first surface and through the beam splitter surface, and then directing the light back into the beam splitter surface.

24. The head-mounted display system of claim 23, wherein the second reflecting surface is curved to provide optical power.

25. The head-mounted display system of claim 22, wherein the body comprises two pieces with the beam splitter surface being within the body.

26. The head-mounted display system of claim 22, wherein the body comprises two pieces with the beam splitter surface being at an interface between the two pieces of the body.

27. The head-mounted display system of claim 20, further comprising a third surface of the body through which light from an environment is received.

28. The head-mounted display system of claim 27, wherein the light from the environment passes through the second surface to the eye of the user.

29. The head-mounted display system of claim 27, wherein the light from the environment is provided by an image intensifier device.

30. The head-mounted display system of claim 20, wherein the display device is a flat panel display.

* * * * *